April 16, 1968  W. J. SCHMIDT, SR  3,377,771
APPARATUS FOR LOADING CANS INTO CARTONS
Filed Dec. 14, 1964  3 Sheets-Sheet 1
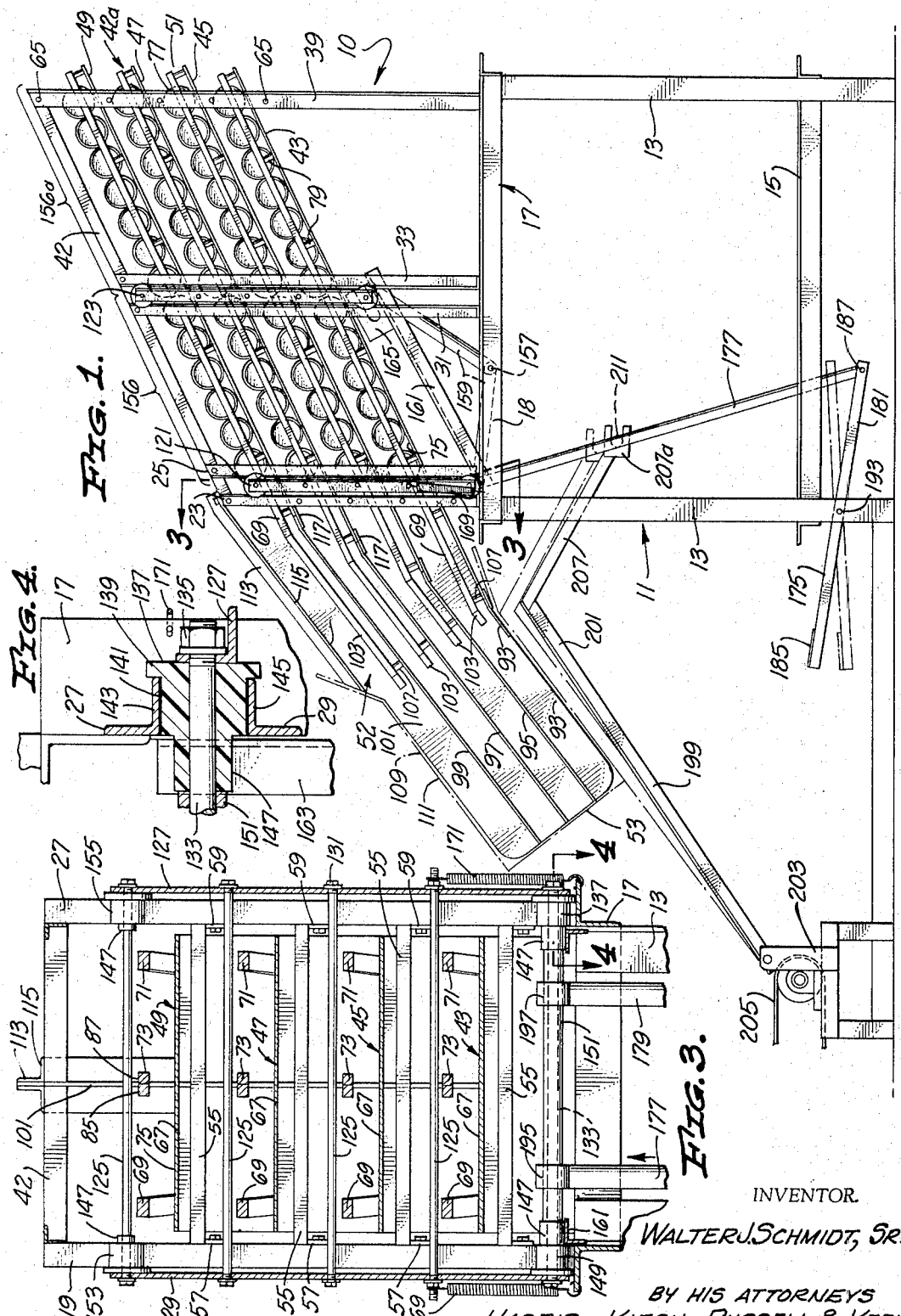
INVENTOR.
*Walter J. Schmidt, Sr.*
BY HIS ATTORNEYS
*Harris, Kiech, Russell & Kern*

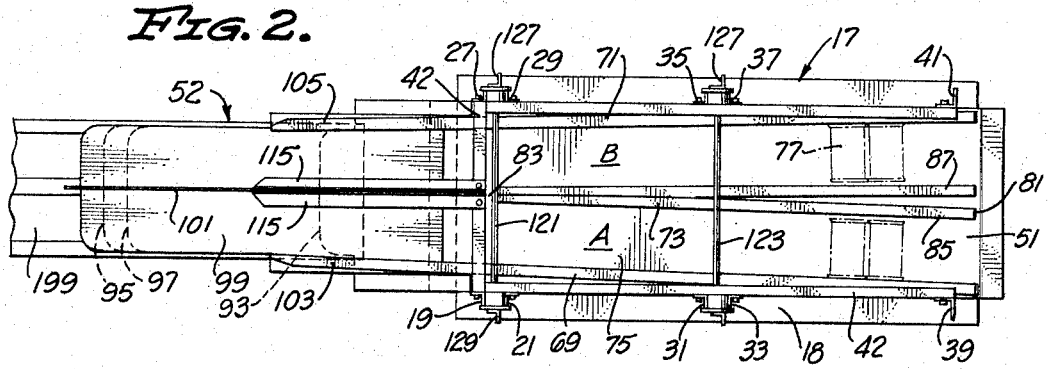

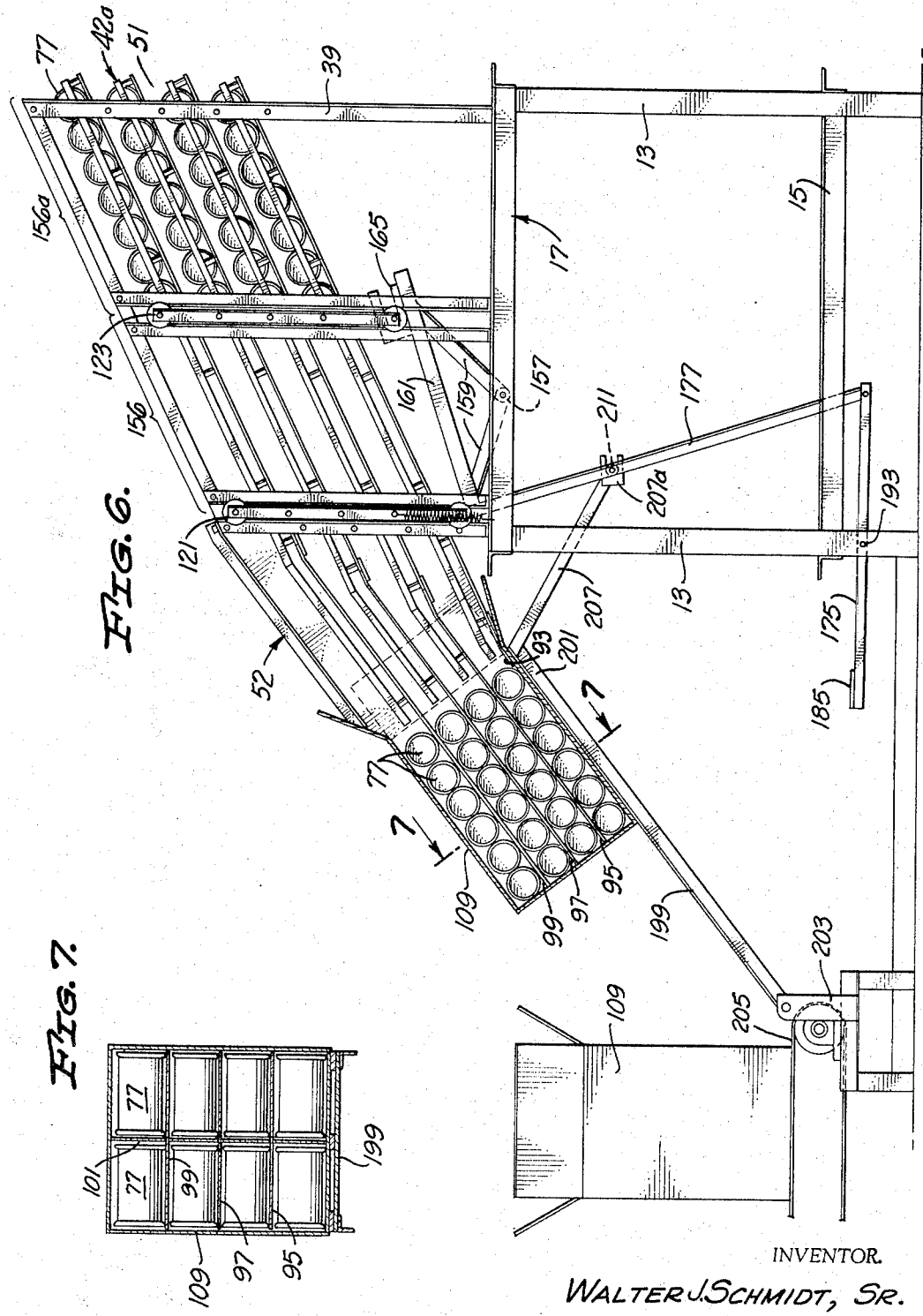

United States Patent Office 3,377,771
Patented Apr. 16, 1968

3,377,771
APPARATUS FOR LOADING CANS
INTO CARTONS
Walter J. Schmidt, Sr., 723 N. Gilbert,
Anaheim, Calif. 92801
Filed Dec. 14, 1964, Ser. No. 417,929
10 Claims. (Cl. 53—153)

ABSTRACT OF THE DISCLOSURE

An apparatus for transporting cans from a storage point to a loading point where they are received by a carton. The cans are supported by a tiered frame which guides and funnels the cans together in both horizontal and vertical planes. Movement of the cans is controlled by gates attached to the frame which are spaced apart to provide a measuring control as to the number of cans allowed to be received by each carton. The cartons are supported and clamped to the frame by a movable, inclined ramp at the loading point. When the cans are received, the cartons break free and slide down the ramp. A unitary control assembly controls both the movement of the cans and the ramp.

---

This invention relates to material handling devices and more particularly to a machine for loading cans into cartons.

In numerous industries such as the food industry, the goods of a producer are sold in cans or other relatively small containers. It is usually desirable to load these cans into relatively large cartons for purposes of shipping the goods from the producer to the retail outlet. Although a machine for loading cans into cartons should function quickly and efficiently, it must not damage the cans. In order to keep material handling costs to a minimum, such a machine should be easy to operate and require the minimum number of operators.

Accordingly, it is an object of this invention to provide a machine for loading cans into cartons which is fast, efficient, will not injure the cans so loaded, is easy to operate, and requires only a single operator.

Another object of this invention is to provide a novel machine for loading a measured quantity of cans into cartons. This is accomplished by providing a support to which is secured a plurality of can-guiding members arranged in tiers and having an inlet end and an outlet end. The cans are caused to move, preferably roll, along each of the can-guiding members and their movement is controlled by front and rear movable spaced gates. A carton is placed over the outlet end of the tiers of can-guiding members, and, by proper manipulation of the gates, the cartons can be filled with a measured quantity of cans.

Another object of this invention is to provide a novel gate structure which will quickly and accurately control the flow of cans on each of the can-guiding members. A pair of tracks is provided on each of the tiers of can-guiding members extending from the lowermost can-guiding member toward the uppermost. Each gate includes a plurality of restraining members, which in restraining position extend across each of the can-guiding members to restrain the flow of cans therealong, and a connecting arm in each pair of tracks for connecting the ends of the restraining members. Preferably two rollers are secured to each of the connecting arms and are mounted for movement between a pair of tracks. This gate may be quickly and easily moved between a restraining position in which it restrains the flow of cans along the can-guiding members and a released position in which it allows at least some of the cans to flow between it and the can-guiding members.

A further object of this invention is to provide a machine for loading cans into cartons which has novel means for controlling the gates thereof. The means for controlling the movement of the gates includes a lever pivotally mounted to a support and engaging both of the spaced gates to cause simultaneous movement thereof and means for urging one of the gates to the restraining position and the other of the gates to the released position. Thus, by pivoting the lever, the gates are controlled so that one of the gates is in the released position and the other of the gates is in the restraining position. The measured quantity of cans is made up of those cans disposed between the spaced gates when the front gate is in the restraining position.

Still another object of this invention is to provide a machine for loading cans into cartons which can be used to fill different size cartons by supplying different measured quantities of cans. In one instance this is accomplished by providing a gate extension for either or both of the spaced gates to thereby vary the measured number of cans which is disposed between the gate and gate extension or between the gate extensions.

A further object of this invention is to provide a machine for loading cans into cartons which funnels the cans as they progress toward the carton to be filled. This may be accomplished by providing a plurality of spaced rails on each can-guiding member with the space between adjacent rails decreasing toward the outlet end of the machine and a plurality of elongated wedge-shaped members being positioned alternately with the rails and extending from the inlet end toward the outlet end. The narrow end of each of the wedge-shaped members is disposed adjacent the outlet end and the spaces between adjacent rails and wedge-shaped members form paths of generally constant width throughout their length for the flow of cans therealong. The cans may also be funneled in a vertical plane by reducing the vertical distance between adjacent can-guiding members toward the outlet end of the machine.

A further object of this invention is to provide a machine for loading cans into cartons having novel means for releasably securing the carton in position while it is being filled with cans. An inclined ramp having one end closely adjacent the underside of a carton filling section of the machine and the other end pivotally mounted to a suitable support is provided. The carton is placed over the carton filling section to at least partially envelop same and one wall thereof is clamped between the pivotally mounted ramp and the underside of the carton filling section. The clamping force and the angle of incline of the ramp may be selected so that the force of the cans entering the carton will break the carton free from its clamped position to slide down the ramp to additional materials handling devices.

Still another object of this invention is to provide a machine for loading cans into cartons having a unitary control assembly for moving the ramp to clamp the carton in position to receive a measured quantity of cans, for measuring the number of cans needed to fill the carton, and for releasing such number of cans for movement into the carton.

Further objects and advantages will become apparent from the following description when taken in connection with the accompanying drawings.

In the drawings:

FIG. 1 is a side elevation of the machine for loading cans into cartons having the front gate in restraining position and the rear gate in released position;

FIG. 2 is a fragmentary plan view of the machine for loading cans into cartons;

FIG. 3 is a fragmentary sectional view taken along line 3—3 in FIG. 1;

FIG. 4 is a fragmentary sectional view taken along line 4—4 in FIG. 3 showing how the roller and tracks co-operate;

FIG. 5 is a perspective view showing the unitary control system for moving the gates and the ramp to the desired positions;

FIG. 6 is a side elevational view similar to FIG. 1 showing the front gate in a released position and the rear gate in the restraining position;

FIG. 7 is a sectional view taken along line 7—7 of FIG. 6; and

FIG. 8 is a fragmentary side elevation of an alternate embodiment of the invention showing a gate extension connected to the rear gate.

A machine for loading cans into cartons 10 including a support 11 having four spaced, vertical legs 13, a lower rectangular railing 15 and an upper rectangular railing 17 is shown in FIG. 1. The support 11 may be constructed of any suitable structural members such as angle iron and is preferably of welded construction. It should be understood that the support 11 may assume any size or shape which will suitably support the operating elements of the machine 10.

Secured to one side 18 of the upper rectangular railing 17 and extending upwardly therefrom is a pair of angle members or front tracks 19 and 21. The front tracks 19 and 21 may be attached to the upper railing 17 by any suitable means such as bolts or by welding. Of course, if the front tracks 19 and 21 are to be bolted to the upper railing 17, suitable end plate members (not shown) must be provided to receive the bolt. The front tracks 19 and 21 have slanted upper edges 23 and 25, respectively, with the front track 19 being the shorter of the two.

Another pair of front tracks 27 and 29 which are identical to the tracks 19 and 21, respectively, is similarly secured on the upper railing 17 opposite the tracks 19 and 21 as shown in FIG. 2.

A pair of rear tracks 31 and 33 is suitably secured to the side 18 of the upper railing 17 about half way between the ends of the side 18. Tracks 31 and 33 are preferably spaced like and similar to the front tracks 19 and 21 except that the rear tracks are preferably longer and extend upwardly beyond the railing 17 a greater distance. Another pair of rear tracks 35 and 37 which are identical to the tracks 31 and 33 is secured to the upper railing 17 opposite the rear tracks 31 and 33 as shown in FIG. 2.

A pair of rear corner posts 39 and 41 is suitably secured to opposite sides of the upper railing 17 at the rear end thereof. The rear corner posts 39 and 41 are of equal length and extend upwardly beyond the upper railing 17 for a greater distance than the tracks 33 and 37. Rectangular bracing 42 connects the upper ends of the tracks and the rear corner posts 39 and 41.

A guiding means 42a for guiding cans includes a plurality of can-guiding members 43, 45, 47, and 49 having an inlet end 51 and a chute 52 having an outlet end 53. The can-guiding members are arranged in tiers and attached to the tracks 19, 21, 27, and 29 and to the rear corner posts 39 and 41. Each of the can-guiding members 43, 45, 47, and 49 has near its lower end a metal strip 55, preferably of angle iron, suitably secured as by welding to its underside as shown in FIG. 3. End plates 57 and 59 are welded at the ends of the metal strips 55 and are bolted to the tracks 19 and 27, respectively. Similar metal strips with end plates are provided on the can-guiding members at the inlet end 51 adjacent the rear corner posts 39 and 41 for attachment thereto by a plurality of bolts 65 (FIG. 1). The can-guiding members 43, 45, 47, and 49 could of course be supported in a similar fashion at intermediate points such as the rear tracks 31, 33, 35 and 37, if desired.

Each of the can-guiding members includes a substantially flat plate 67 (FIG. 3), preferably of metal, and a pair of spaced rails 69 and 71 having an elongated wedge-shaped member 73 positioned therebetween. The flat plates 67 provide sloping, preferably elongated, rectangular, upper can supporting surfaces 75 which allow a plurality of cans 77 to roll therealong from the inlet end 51 to the outlet end 53. The word "can" as used herein is not intended to be restricted to a cylindrical metal receptacle but includes any container which will roll, slide, or can be caused to move down the sloping can-supporting surfaces 75.

The rails 69 and 71 are elongated pieces of bar stock which extend from the inlet end 51 toward the outlet end 53. At the inlet end 51, the rails 69 and 71 are positioned along the longitudinal edges of the flat plate 67, and, as they extend along the flat plate, they slope inwardly from the longitudinal edges to thereby decrease the spacing between the rails as shown in FIG. 2. The rails 69 and 71 are spaced vertically from the can-supporting surface 75 by a plurality of spacers 79. Although the spacers may be welded to the flat plate 67 and to the rails 69 and 71, it is preferred that the spacers be tubular to allow the passage of a bolt (not shown) therethrough to secure them to the flat plate 67 and to the rails 69 and 71.

The elongated wedge-shaped member 73 has a wide end 81 adjacent the inlet end 51 and a narrow end 83 adjacent the tracks 19 and 27 as shown in FIG. 2. The elongated wedge-shaped member 73 includes a pair of elongated bars 85 and 87 which are spaced adjacent the inlet end 51 and then become contiguous and finally terminate as they approach the area adjacent the tracks 19 and 27. The bars 85 and 87 taper as they extend toward the outlet end 53 and are supported by and spaced from the flat plate 67 by a plurality of spacers (not shown) which are similar to the spacers 79 used to support the rails 69 and 71.

The spaces along the flat plate 67 between the elongated wedge-shaped member 73 and the rails 69 and 71 form a pair of paths A and B, respectively, for the flow of cans therealong. The width of the paths A and B is selected so as to allow the cans 77 to roll freely therein. The width of the paths A and B is generally constant throughout their lengths. Thus, when the cans 77 enter the inlet end 51, the cans in the path A are relatively widely spaced by the wedge-shaped member 73 from the cans in the path B. As the cans in the paths A and B roll down the inclined flat plate 67 between the rails and the elongated wedge-shaped member, they are funneled toward each other in a horizontal plane until they are very narrowly separated by the narrow end 83 of the elongated wedge-shaped member 73. Although only two paths A and B have been shown, it is evident that additional paths may be provided by following the teachings of this invention. Likewise, any desired number of can-guiding members may be provided depending upon the rows of cans desired to be put in the cartons.

The chute 52, which is an integral structure and forms part of the guiding means 42a, has a plurality of can-supporting members 93, 95, 97, and 99. One for each of the can-guiding members is provided. The chute 52 is secured to the can-guiding members so that the can-supporting members 93, 95, 97, and 99 form continuous extensions thereof. The chute 52 also includes a vertically extending divider 101, aligned with the wedge-shaped members 73. The divider 101 is a thin sheet of metal which interconnects the can-supporting members and is slightly thinner than and aligned with the wedge-shaped members 73 so as to form an extension thereof.

Because the chute 52 is a compact structure, the space available for welding, bolting, or use of similar fasteners to connect the divider 101 with the can-supporting members is rather limited. Accordingly, in construction of the chute 52 it is preferred to slot the ends of the can-supporting members and the divider 101 and interconnect the slotted portions thereof.

To further control the flow of cans along the chute 52, a pair of rail extensions 103 and 105 is formed on each of the can-supporting members to form continuous extensions of the rails 69 and 71. The rail extensions 103 and 105 are connected to and vertically spaced from the can-supporting members by a plurality of spacers 107 which are similar to the spacers 79. The space between the pairs of rail extensions 103 and 105 decreases as the rail extensions extend toward the outlet 53. The divider 101, as indicated above, is a sheet of metal which does not taper but divides the area between the rail extensions to form extensions of the paths A and B. The paths A and B are of generally constant width with the transition from the wedge-shaped member 73 to the divider 101 being preferably the only irregularity. The rail extensions 103 and 105 stop short of the end of the chute 52 so that a carton 109 may be slid over a carton-filling section 111 of the chute. Thus, the cans 77 roll down the can-guiding members 43, 45, 47, and 49 on the can-supporting surfaces 75 to the can-supporting members 93, 95, 97, and 99, and finally enter the carton 109.

The chute 52 has an upwardly extending web 113 having a flange 115 provided thereon for additional rigidity, the web being bolted to the bracing 42. The can-supporting members 93, 95, 97 and 99 are secured to the end of the can-guiding members of which they are extensions by a plurality of plates 117 which receive bolts that pass through the flat plates 67, the spacers 79, and the rails 69 and 71. Thus, the chute 52 is rigidly supported by the members to which it is attached.

The cans 77 are also funneled together or toward each other in a vertical plane. Thus, although the can-guiding members 43, 45, 47 and 49 are generally parallel, the vertical distance therebetween decreases slightly toward the outlet end 53. In the chute 52, the can-supporting members 93, 95, 97, and 99 are preferably parallel although they are slightly closer together than the surfaces 75 to which they are attached.

It is preferred that the can-guiding members 43, 45, 47, and 49 and the can-supporting members 93, 95, 97 and 99 be inclined so that the cans 77 will roll therealong. It is also preferred that the can-supporting members 93, 95, 97 and 99 have a larger angle of inclination than the can-guiding members. In one instance, the can-guiding members formed an included angle of about 24° with the horizontal and the can-supporting members formed an included angle with the horizontal of approximately 41°. These angles appear to give optimum results considering the speed of can flow, possible damage to the cans, and the forces exerted by the rolling cans on a front gate 121 and a rear gate 123 and the carton 109.

The front gate 121 and the rear gate 123 are provided to control the movement of the cans 77 along the can-guiding members. As the gates are preferably identical, only the front gate 121 (FIG. 5) need be described in detail and corresponding reference numerals are used to designate the same parts in the respective gates. The front gate 121 includes a plurality of horizontal restraining members 125 which are preferably elongated bolts secured together by two connecting members 127 and 129. One restraining member 125 is provided for each of the can-guiding members. The connecting members 127 and 129, which may be angle iron, join the ends of the restraining members 125. The connecting members 127 and 129 may be joined in any suitable manner to the restraining members 125. If elongated bolts are used for the restraining members 125, the bolt head at one end and a nut 131 at the other end will prevent the connecting members 127 and 129 from moving outwardly.

An elongated bolt or crossbar 133 connects the lowermost end portions of the connecting members 127 and 129 (FIG. 4). The crossbar 133 is secured to the connecting member 127 by a nut 135. A roller 137 having a stepped cylindrical outer surface is mounted for rotation on the crossbar 133. The roller 137 has a peripheral flange 139 which is closely adjacent the tracks 27 and 29 and a cylindrical surface 141 which is sandwiched between and free to roll upon a leg 143 or a leg 145 of the tracks 27 and 29, respectively. The roller 137 also has a cylindrical surface of reduced diameter 147.

A roller 149 which is identical to the roller 137 is mounted for rotation on the crossbar 133 adjacent the connecting member 129. A sleeve 151 is mounted over the shaft 133 and serves to separate the rollers 137 and 149 and to prevent inward movement of the connecting members 127 and 129.

The uppermost restraining member 125 connects the tops of the connecting arms 129 and 127. Mounted for rotation at both ends of the uppermost restraining member 125 is a pair of rollers 153 and 155 which are identical to the roller 137 except that they have a smaller cylindrical surface of reduced diameter 147. The rollers 153 and 155 bear against the connecting arms 127 and 129 which prevent their outward movement and against the tracks 19 and 21 and 27 and 29, respectively, which prevent them from moving inwardly.

The front gate 121 is movable in its tracks between a restraining position in which it restrains the movement of cans along the can-guiding members and a released position in which it allows the cans to flow between it and the can-guiding members. The rear gate 123 is similarly movable between a restraining position and a released position. In the restraining position, the restraining members 125 are positioned across the lines of cans on the can-guiding members to prevent movement thereof. To reach the released position, the gates 121 and 123 and their respective restraining members 125 are moved upwardly until there is sufficient clearance between each restraining member 125 and its associated can-guiding member to allow the passage of cans therebetween.

In order that a predetermined measured quantity of cans may be supplied to the carton 109, the gate 121 must be in the restraining position when the gate 123 is in the released position, and the latter should be in the restraining position when the former is in the released position. Thus, with the forward gate 121 in the restraining position and the rear gate 123 in the released position (FIG. 1), cans will completely fill the paths A and B between the gates. As the front gate 121 is raised toward the released position by means described subsequently, the rear gate 123 is lowered toward the restraining position; and just prior to the time that the front gate reaches the released position, the rear gate must reach the restraining position so that only those cans between the gates are released to flow into the carton 109 (FIG. 6). Of course, the space between the gates and can size are selected so that the desired number of can may be contained in such space and so that the restraining members 125 on the rear gate 123, in moving downward to the restraining position, will come between adjacent cans 77. Thus, the can-guiding members between the gates form a measuring section 156 and the can-guiding members upstream of the rear gate form a storing section 156a for cans.

To perform the desired manipulation of the gates 121 and 123, a rod 157 having four arms 159 welded thereto is suitably pivotally secured to the upper rectangular railing 17. A pair of members 161 and 163 which may be constructed of angle iron is secured to and connect the ends of the arms 159 as shown in FIG. 5. The members 161 and 163, the arms 159, and the rod 157 form a rigid truss-like structure or lever which rocks or pivots about the axis of the rod 157, which acts as a fulcrum intermediate the support portions of the lever structure. A pair of slotted blocks 165 and 167 is welded to the members 161 and 163, respectively, with the slot of each block receiving the cylindrical surface of reduced diameter 147 of the rollers 137 and 149 on the rear gate 123. The slotted blocks 165 and 167 may receive the sleeve 151 of the rear gate 123 in lieu of the cylindrical surface of reduced diameter 147. The other ends of the members 161 and 163 engage the lower surfaces of the rollers 137 and 149 of the front gate 121. The members 161 and 163 may engage the cylindrical surfaces of reduced diameter 147 or they may engage the bottom surface of the sleeve 151.

A pair of springs 169 and 171 is suitably secured to the gate 121 and to the upper railing 17 to urge the front gate to the restraining or lowered position. The weight of the front gate 121 also urges the front gate to the restraining or lowered position as shown in FIG. 1. The weight of the front gate 121 and the force of the springs 169 and 171 normally hold the front gate in the restraining position. The weight of the rear gate 123 urges itself downward toward the restraining position. However, as the rear gate 123 attempts to assume the restraining or lowered position, it is prevented from doing so by the members 161 and 163 which bear on the under side of the gate 121. Thus, the rear gate 123 normally assumes the released position shown in FIG. 1.

It is apparent that by rotating the lever structure, formed in part by the members 161 and 163 and the rod 157, clockwise as viewed in FIG. 1 the front gate 121 and the rear gate 123 will be caused to move from the position shown in FIG. 1 to the position shown in FIG. 6. To perform this function a unitary control assembly 173 which includes a pedal 175 and a pair of links 177 and 179 is provided. The pedal 175 includes a pair of side members 181 and 183 connected together by an actuator 185 and a bolt 187 which passes through a sleeve 189. A tubular shaft 191 connects the side members 181 and 183 intermediate their ends and receives a pin 193 (FIG. 1) therethrough which pivotally mounts the pedal 175 between an adjacent pair of legs 13 of the support 11. The links 177 and 179 are preferably integral with the sleeve 189 and extend upwardly therefrom to the sleeve 151 to which they are attached by a pair of looped end portions 195 and 197. Thus, by stepping on the actuator 185 of the pedal 175, the pedal pivots counterclockwise as viewed in FIG. 1 and raises the links 177 and 179 which in turn raise the front gate 121 to the released position shown in FIG. 6. As the front gate 121 is raised toward the released position, it frees the rear gate 123 for downward movement toward the restraining position. The rear gate 123 will then move to the restraining position under the force of its own mass. Of course, suitable resilient means may be applied to urge the rear gate 123 to the restraining position, if desired. The restraining members 125 on the front gate 121 and the rear gate 123 are preferably vertically arranged so that in moving from the position shown in FIG. 1 to that shown in FIG. 6, the rear gate will be effective to restrain the flow of cans toward the outlet 53 before the front gate has reached the released position. Thus, only those cans which are between the front gate 121 and the rear gate 123 are allowed to roll down the chute 52 into the carton 109.

As shown in FIG. 1, the carton 109 is placed over the carton-filling section 111 to receive a measured quantity of cans that are allowed to roll down the chute 52. An inclined ramp 199 having an end 201 closely adjacent the lowermost can-supporting member 93 or the underside of the carton-filling section is pivotally mounted at its other end to a support 203 adjacent a suitable conveyor 205. A pair of ramp arms 207 and 209 having enlarged slotted end portions 207a and 209a, respectively, is rigidly secured to the ramp at one end and the slotted end portions receive a cross-piece 211 which is integral with the links 177 and 179. The ramp arms form part of the unitary control assembly 173.

Thus, the ramp 199 may be pivoted so that the carton 109 is loosely clamped between the end 201 of the ramp and the lowermost can-supporting member 93. Preferably the carton 109 is loosely clamped between the end 201 of the inclined ramp 199 and the lowermost can-supporting member 93 so that the force of the measured quantity of cans entering the carton is sufficient to break the carton free from its clamped position to allow the carton with the measured quantity of cans therein to slide down the inclined ramp to the conveyor 205. The included angle between the ramp and the horizontal is preferably about the same as the included angle between the can-supporting members and the horizontal and is chosen so that the carton 109 will turn upright when it reaches the conveyor 205 as shown in FIG. 6.

With the machine in the position shown in FIG. 1, a plurality of cans 77 is supplied by any suitable means such as conveyors to the can-guiding members 43, 45, 47, and 49. These cans 77 are free to roll in the converging paths A and B down the can-guiding members until they strike the restraining members 125 of the front gate 121. A carton 109 is placed over and at least partially envelops the carton-filling section 111 and is temporarily held there by the operator. The operator then depresses the actuator 185 of the unitary control assembly 173. This causes the links 177 and 179 to move upward to simultaneously pivot the ramp 199 to the position shown in FIG. 6 to clamp the carton in position over the carton-filling section 111 and raise the gate 121 which then allows the rear gate 123 to lower to the restraining position. The lowering of the rear gate 123 to the restraining position measures the number of cans which are allowed to roll down the chute into the carton 109 and the raising of the front gate 121 releases that measured number of cans for movement into the carton. As the carton 109 is loosely clamped in position, the force of the measured quantity of cans entering the carton is sufficient to break the carton free from the clamped position and allow it and the measured quantity of cans to slide down the inclined ramp 199. When the carton 109 strikes the conveyor 205, it pivots to the upright position (FIG. 6) and is moved along by the conveyor to subsequent stations where other operations such as sealing the carton may be performed. To return the device to the condition shown in FIG. 1, the operator removes his foot from the actuator 185 and the springs 169 and 171, the weight of the gate 121, and the weight of the unitary control assembly 173 move the front gate downward to the restraining position and simultaneously force the rear gate 123 upwardly by pivoting of the lever structure formed in part by members 161 and 163. The cycle described above is then repeated for other cartons.

An important feature of this invention is that the cans on the lowermost can-guiding member 43 enter the carton first, the cans on the next higher can-guiding member 45 enter the carton second, etc., until finally the cans on the uppermost can-guiding member 49 enter the carton. If this were not so, slight deflections of the chute 52 caused by cans on the next higher can-supporting member might hamper entry of the cans therebelow into the carton. To provide the desired sequence of can movement into the carton, the cans on the higher tiers are required to move over a longer path in moving from the front gate 121 to the carton and the distance the can-guiding members extend beyond the front gate 121 increases progressively from the bottom of the machine to the top.

Although the specific embodiment illustrated employed angle iron for many of its components, it should be understood that other structurally suitable materials and forms thereof may be employed. Any suitable method of transporting cans to and from the can-loading machine may be used. Although four tiers of can-guiding members have been shown, it is apparent that any suitable number of these may be employed. Likewise, any convenient number of paths on each can-guiding member may be provided.

It is apparent therefore that the machine for loading cans into cartons disclosed herein funnels the cans in both horizontal and vertical planes from relatively widely spaced paths to very closely adjacent paths for entry into the carton. The unitary control assembly measures the number of cans needed to fill the cartons, clamps the carton in position to receive the measured number of cans, and releases the measured number of cans to allow them to roll down the chute 52 into the carton, The angles of incline of the can-guiding members including the chute 52 and the angle of incline of the ramp 199 are chosen to provide the optimum rate of can movement without causing damage thereto and to allow the carton 109 to assume an upright position when it strikes the conveyor 205. The front gate 121 and the rear gate 123 are designed to provide efficient control for the movement of cans along the can-guiding members.

It is only the cans in the measuring section 156 which are released by the front gate 121 for movement to the carton-filling section 111. For the sake of versatility it is desirable to provide means for varying the size of the measuring section 156 so that the machine 10 may be used to fill cartons of different sizes and may be used with cans of different sizes. FIG. 8 illustrates one manner in which this may be accomplished. A gate extension 221 is preferably releasably secured as by bolting to the connecting members 127 and 129 of the rear gate 123 so that the gate extension extends toward the front gate 121. The gate extension 221 includes four extension members 223 (only two being shown in FIG. 8), one restraining member 227 for each of the can-guiding members, and a pair of connecting arms 229 for connecting the ends of the restraining members. The gate extension 221 is essentially like the rear gate 123 except that it has no rollers and no sleeve 151.

In use of the embodiment shown in FIG. 8, the gate extension 221 is suitably bolted to the rear gate 123 and the restraining members 125 in the rear gate may, if desired, be removed. The machine is then operated as described hereinabove; however, as the measuring section 156 has been decreased in length, a fewer number of the same size cans will be released by the front gate 121 to flow into the carton 109.

It should be understood that the gate extension 221 may be attached to either the front gate 121 or the rear gate 123, or both of the gates may be provided with such an extension. The length of the measuring section 156 could also be increased by extending the gate extension 221 up the inclined can-guiding members from the rear gate 123. Of course, if this were done, the restraining members 125 in the rear gate 123 would have to be removed in order to enlarge the length of the measuring section 156. The gate extensions 221 may be provided with various lengths of extension members 223, but preferably the extension members 223 are all of such a length as to allow the restraining members 227 in moving downward to come between adjacent cans 77.

Various changes, modifications, and substitutions may be made by those having ordinary skill in the art without departing from the spirit and scope of this invention.

What is claimed is:

1. A machine for loading cans into a carton comprising:
    guiding means for guiding said cans therealong, said guiding means being inclined at one end thereof to define a carton-filling section, said carton-filling section having an under side and being adapted to be at least partially enveloped by said carton;
    a movable inclined ramp having one end thereof closely adjacent said under side of said carton-filling section, said one end of said inclined ramp and said under side of said carton-filling section being adapted to clamp one wall of said carton therebetween;
    means for moving said cans along said guiding means onto said carton-filling section and into said carton; and
    means for moving said one end of said inclined ramp toward said under side of said carton-filling section to clamp said carton therebetween.

2. A machine as set forth in claim 1 wherein the movement of said cans into said carton exerts a force thereon and said carton is loosely clamped between said one end of said inclined ramp and said under side of said carton-filling section so that said force of said cans entering said carton is sufficient to break said carton free from its clamped position between said inclined ramp and said under side of said carton-filling section to allow said carton with said cans therein to slide down said inclined ramp.

3. A machine in accordance with claim 1 wherein said inclined ramp is pivotally mounted at the other end thereof and said one end is pivoted toward said under side of said carton-filling section by said moving means.

4. A machine for moving cans into a carton comprising:
    a series of can-guiding members secured together in tiers, said can-guiding members having an inclined carton-filling section at one end thereof, said carton-filling section being adapted to be partially enveloped by said carton;
    a movable inclined ramp having one end closely adjacent the lowermost of said can-guiding members, said one end of said inclined ramp and said lowermost can-guiding member being adapted to clamp one wall of said carton therebetween;
    means for moving said cans along said can-guiding members toward said carton-filling section; and
    means for moving said inclined ramp toward said lowermost can-guiding member to clamp said carton therebetween and for supplying a measured quantity of cans through said carton-filling section to said carton.

5. A machine for loading cans into a carton comprising:
    guiding means for guiding said cans therealong, said guiding means being inclined at one end thereof to define a carton-filling section, said carton-filling section having an under side and being adapted to be at least partially enveloped by said carton;
    a movable inclined ramp having one end thereof closely adjacent said under side of said carton-filling section, said one end of said inclined ramp and said under side of said carton-filling section being adapted to clamp one wall of said carton therebetween;
    propelling means for causing movement of said cans along said guiding means onto said carton-filling section and into said carton;
    gate means for periodically halting said movement of said cans along said guiding means; and
    unitary control assembly means for moving said one end of said inclined ramp toward said under side of said carton-filling section to clamp said carton therebetween, for measuring the number of cans to fill said carton, and for releasing said number of cans for movement by said propelling means into said carton.

6. A machine for loading cans into a carton comprising:
    guiding means for guiding said cans therealong, said guiding means at one end forming a carton-filling section;
    propelling means for moving said cans along said can-guiding means toward said carton-filling section;
    a rear gate movable between a restraining position in which it restrains the flow of cans along said guiding means and a released position in which it allows at least some of said cans to flow between it and the guiding means;
    a front gate adjacent said carton-filling section and spaced from said rear gate in the direction of can movement, said front gate being movable between a restraining position in which it restrains the flow of cans along said guiding means a released position in which it allows at least some of said cans to flow between it and the guiding means;

a lever having ends respectively engaging said rear gate and said front gate to cause simultaneous movement thereof;

means for pivotally mounting said lever intermediate its ends; and means for pivoting said lever to move said front gate to the released position and said rear gate to the restraining position whereby a measured number of cans are released from said front gate for movement into said carton-filling section.

7. A machine as defined in claim 6 wherein said guiding means includes a series of can-guiding members arranged in tiers and said gates have restraining members which in restaining position extend acoss each of said can-guiding members to restrain the flow of cans therealong.

8. A machine for loading cans into a carton comprising:

a series of can-guiding members secured together in tiers;

means for causing movement of said cans along said can-guiding members;

a pair of tracks on each side of said tiers of can-guiding members extending from the lowermost of said can-guiding members to the uppermost of said can-guiding members; and a gate movable in said tracks between at restraining position in which it restrains the movement of cans along said can-guiding members and a released position in which it allows at least some of said cans to move between it and the can-guiding members, and including restraining members which in said restraining position extend across each of said can-guiding members to restrain the movement of cans therealong, connecting arms movable in each of said pair of tracks and connecting the ends of said restraining members, and at least one roller secured to each of said connecting arms and mounted for movement along said tracks.

9. A machine as defined in claim 8 wherein each of said can-guiding members has a sloping upper can-supporting surface for supporting said cans thereon.

10. A machine for loading cans into a carton comprising:

guiding means for guiding said cans, said can-guiding means at one end forming a carton-filling section;

propelling means for moving said cans along said can-guiding means toward said carton-filling section;

a rear gate movable between a restraining position in which it restrains the flow of cans along said guiding means and a released position in which it allows at least some of said cans to flow between it and the guiding means;

a front gate adjacent said carton-filling section and spaced from said rear gate in the direction of can movement to form a measuring section therebetween, said front gate being movable between a restraining position in which it restrains the flow of cans along said guiding means and a released position in which it allows at least some of said cans to flow between it and the guiding means;

means to manipulate said rear gate and said front gate so that only the cans in said measuring section are released for movement by said propelling means toward said carton-filling section, and means for adjusting the size of said measuring section including a gate extension secured to said rear gate and extending toward said front gate, said gate extension being movable between a restraining position in which it restrains the flow of cans along said guiding means and a released position in which it allows at least some of said cans to flow between it and the guiding means.

References Cited
UNITED STATES PATENTS

| | | | |
|---|---|---|---|
| 2,148,820 | 2/1939 | Kimball et al. | 53—153 X |
| 2,116,793 | 5/1938 | Kimball et al. | 53—152 |
| 2,127,924 | 8/1938 | Kimball et al. | 53—152 |
| 2,500,699 | 3/1950 | Nakaura | 53—153 |
| 2,738,630 | 3/1956 | Scholtz | 53—152 X |

TRAVIS S. McGEHEE, *Primary Examiner.*